United States Patent [19]

Mauritzon

[11] 4,115,511

[45] Sep. 19, 1978

[54] CONTINUOUS VULCANIZATION OF RUBBER

[76] Inventor: Rune Mauritzon, Box 2024, 550 02 Jönköping, Sweden

[21] Appl. No.: 743,660

[22] Filed: Nov. 22, 1976

[30] Foreign Application Priority Data

Nov. 27, 1975 [SE] Sweden .................................. 7513413

[51] Int. Cl.$^2$ ............................................. B29H 5/01
[52] U.S. Cl. ...................... 264/347; 264/236
[58] Field of Search ............... 264/347, 236; 425/325, 425/363

[56] References Cited

U.S. PATENT DOCUMENTS

| | | | |
|---|---|---|---|
| 1,689,205 | 10/1924 | Lamplough | 264/236 |
| 2,324,981 | 7/1943 | Bosomworth | 264/347 |
| 2,426,341 | 8/1947 | Canfield | 264/347 |
| 2,426,775 | 9/1947 | Lang | 264/347 |
| 2,553,938 | 5/1951 | Peirce | 264/347 |
| 2,561,820 | 7/1951 | Ramsey et al. | 264/347 |
| 2,581,230 | 1/1952 | Berggren | 264/347 |
| 2,581,255 | 1/1952 | Henning | 264/347 |
| 3,445,554 | 5/1969 | Jerome | 264/338 |
| 4,029,450 | 6/1977 | Caser | 264/347 |

FOREIGN PATENT DOCUMENTS

840,007 4/1939 France ............................... 264/83

Primary Examiner—Jay H. Woo
Attorney, Agent, or Firm—Strauch, Nolan, Neale, Nies & Kurz

[57] ABSTRACT

A method and an apparatus for vulcanization of rubber and rubberized materials in which a strip of material to be vulcanized is continuously transported from one autoclave to a second autoclave and thence to a third autoclave. Material is unrolled from a roll in the first autoclave, passed into and along a plurality of back and forth paths in the second autoclave and thence into the third autoclave where the strip is rolled. In all three autoclaves overpressure is maintained, and the second autoclave is the only one where vulcanization temperature is maintained. Closed strip communication channels are provided between the first and second and the second and third autoclaves. The channels are cooled to avoid passage of the high vulcanization temperatures from the second autoclave to the other autoclaves.

3 Claims, 3 Drawing Figures

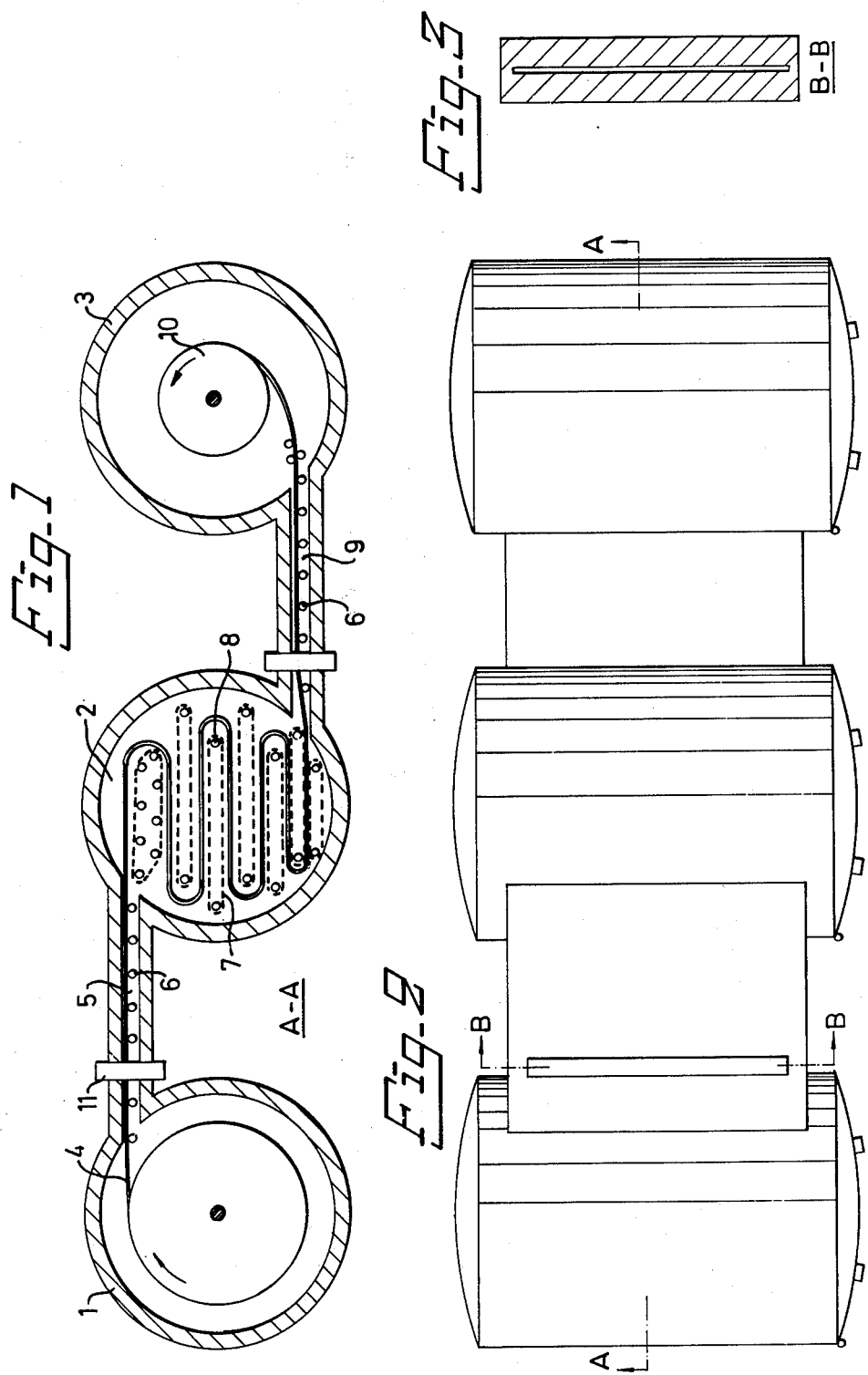

CONTINUOUS VULCANIZATION OF RUBBER

The present invention relates to a method of continuous vulcanization of rubber or rubber like material.

The invention also relates to an apparatus for carrying out the method of vulcanization of rubber or rubber like material. It is especially well suited for vulcanization of plate formed materials, such as for example rubber cloth, rubber mats and rubber covered fabric.

Hitherto known apparatuses for continuous vulcanization of rubber work on the basis that the material should be fed through some kind of liquid seal into and out of an autoclave having high temperature and high pressure. For unvulcanized rubber it is very difficult to maintain a relatively high pressure at the same time as the material is to be fed into an autoclave which maintains vulcanization temperature. This has led to the result that a continuous method of vulcanization of plate formed rubber strips is not industrially used to any substantial extent.

The disadvantages mentioned above have resulted in the situation where vulcanization of, among others, rubber cloth today is made either in big autoclaves or in mechanic presses. Vulcanization in an autoclave is made in the following way. After calendering the rubber cloth is rolled up with fabric between the layers in order to provide an even pressure over the whole cloth and to prevent the rubber layers being vulcanized together. Thereafter it is placed into a big autoclave, in which the temperature and the pressure are slowly raised during the vulcanization process.

After the vulcanization, the rubber cloth and the fabric are rolled off separately. When using this method the side edges of the rubber cloth become uneven and must be cut. The fabric must be cleaned and rolled up again for use at the next vulcanization. It can only be used a few times. The cutting of the edges gives waste rubber as a result. The costs for the handling of the intermediate fabric and the costs for the fabric are high, and in the future there might arise difficulties in getting people to do this rather boring work.

At vulcanization in a press or belt vulcanizer the vulcanization is made between press plates or on a rotating drum under mechanical pressure. In those cases where the rubber cloth is very thin, no vulcanization in presses can be made because of the fact that rubber flows poorly and it is difficult to obtain any levelling effect. These vulcanization methods are characterized by high investment costs and relatively low capacity. Therefore, the machine and work costs are high. A belt vulcanizer is very expensive to buy and has a relatively low capacity. It is handled by two persons. The edge waste material is of great quantity.

Vulcanization can also be made in ovens substantially at atmospheric pressure. Thereby a cloth with a certain porosity is obtained having an uneven and bad surface. For laminated types of cloth there is a risk that the separate layers will not stick together because of enclosed air, and there is also a risk of hanging which will cause an uneven thickness.

Compared to hitherto described vulcanization methods the present method is very cheap. The capital cost for the appratus in relation to the capacity of the apparatus is much lower than the cost for the known methods. Also, the costs for edge waste material and intermediate fabric are eliminated. Furthermore, the apparatus does not require as many handling persons as the known methods, which of course also is economically advantageous. The direct action of the gas pressure on the material eliminates the risks for blisters and pores, which contributes to a product of higher quality.

By the present invention an improved method of continuous vulcanization of preferably rubber cloth, rubber covered fabric and other strips of rubber or a rubber like material is thus provided.

In the method according to the invention in general outline, the material is continuously transported from a first means comprising an unrolling device and into a second means with such a temperature that vulcanization takes place during the transport through said second means, which is done in a path running to and fro, whereafter the material is rolled up. In vulcanization by this method a device comprising three interconnected autoclaves is preferably used. All the autoclaves are kept at overpressure to avoid blisters in the material.

An embodiment example of the invention will be described with reference to the attached drawings, in which FIG. 1 shows a side view of the apparatus;

FIG. 2 shows the apparatus as seen from above; and

FIG. 3 shows a sluice located between a first and a second autoclave.

The side view shown in FIG. 1 of the apparatus illustrates the vulcanization in general outline. The vulcanization takes place in such a way, that the unvulcanized rubber cloth 4 is unrolled in a first, unheated autoclave 1 and transported through a connection channel 5 to a second, hot autoclave 2. In this autoclave the temperature must be so high, that vulcanization takes place during the time that the material moves through this second autoclave. To restrict the size of this autoclave, it is suitable to make the material move to and fro in this autoclave. During the movement the material is supported by rolls 6 or a close-meshed net 7, which in turn is supported by rolls 8. After the material has moved through the second autoclave it is vulcanized and transported further through a second connection channel 9 to an uprolling device 10, which is suitably located in a connected third autoclave 3.

To avoid vulcanization being commenced in the first autoclave with accompanying negative consequencies, it is of great importance that its temperature is kept low. To avoid heat leakage to the first autoclave, the pressure must be kept somewhat higher in the first autoclave at the same time as the connection channel is provided with a sluice 11. Possible leakage of gaseous hot medium must not be of such extent that it can lead to unvulcanized cloth in the first autoclave beginning to be vulcanized with the accompanying risk of the layers being vulcanized together. The sluice 11 is provided to reduce the extent of the leakage. The connection channels should also be provided with cooling means.

The invention is of course not restricted to the embodiment described above as an example but can be modified within the scope of the attached claims.

What I claim is:

1. A method of vulcanization of a strip of rubber or rubberlike material under such an overpressure that blisters in the material are avoided by the material being continuously transported from a first means, in which overpressure and a low temperature are maintained, through a connection to a second means, in which overpressure and vulcanization temperature are maintained, and wherein the material is unrolled in said first means and transported in a path running to and fro through said second means, whereafter the material rolled up and in that the pressure in said first means is kept somewhat higher than the pressure in said second means in order to reduce the heat leakage, via said connection path, from said second means to said first means.

2. The method according to claim 1, wherein the rolling up of the material is accomplished in a third means, in which overpressure is maintained, and a connection path connects between said second and third means.

3. The method according to claims 1, wherein a connection channel provides the connection path between said first means and said second means and the channel is cooled to reduce the heat leakage through the channel from said second means to said first means.

* * * * *